United States Patent [19]

Boldt et al.

[11] 4,017,129
[45] Apr. 12, 1977

[54] TELEVISION RECEIVER CABINET WITH FORMED DECORATIVE FRONT

[75] Inventors: Melvin H. Boldt, Glenview; David P. Chuboff, North Barrington; Robert W. Becker, Naperville, all of Ill.

[73] Assignee: Zenith Radio Corporation, Glenview, Ill.

[22] Filed: Nov. 14, 1975

[21] Appl. No.: 632,350

[52] U.S. Cl. .................. 312/7 TV; 312/7 R; 312/204; 312/257 A; 358/254
[51] Int. Cl.² .................. H05K 5/00; A47B 81/06
[58] Field of Search ............. 312/7 TV, 7 R, 204, 312/257 A, 257 SM; 178/7.9

[56] References Cited

UNITED STATES PATENTS

| | | | |
|---|---|---|---|
| 2,458,368 | 1/1949 | Kamin et al. | 178/7.9 |
| 2,750,587 | 6/1956 | Nicholson et al. | 312/7 R |
| 2,896,200 | 7/1959 | Aeschliman | 312/7 TV |
| 2,929,667 | 3/1960 | Jackson | 178/7.9 |
| 3,240,876 | 3/1966 | Whitney | 178/7.9 |
| 3,294,905 | 12/1966 | Jonassen | 312/7 TV |
| 3,489,852 | 1/1970 | Vistain, Jr. et al. | 178/7.9 |
| 3,595,337 | 7/1971 | Furey | 312/7 R |

FOREIGN PATENTS OR APPLICATIONS

| | | | |
|---|---|---|---|
| 251,330 | 4/1964 | Australia | 178/7.9 |

*Primary Examiner*—Paul R. Gilliam
*Assistant Examiner*—Victor N. Sakran
*Attorney, Agent, or Firm*—Nicholas A. Camasto

[57] ABSTRACT

A television receiver includes a wood cabinet shell having a front frame defining an opening, a rigid escutcheon for supporting a picture tube within the cabinet, a chassis mounted in the cabinet, a back closing the rear of said cabinet and a formed decorative trim member, sandwiched between the escutcheon and the front frame, and overlying rabbetted portions of the cabinet front, side and top. The overlying portions are glued to the cabinet.

7 Claims, 4 Drawing Figures

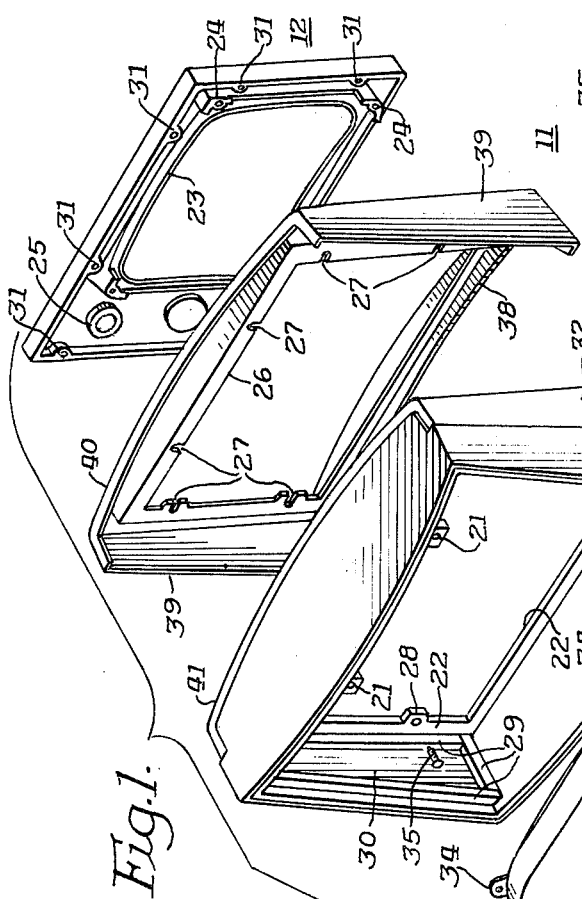
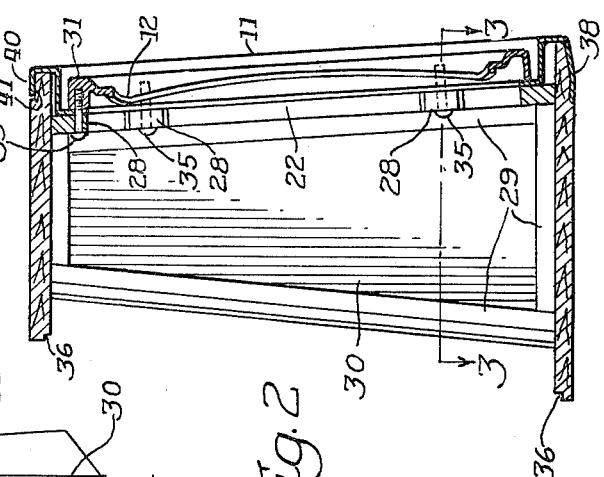
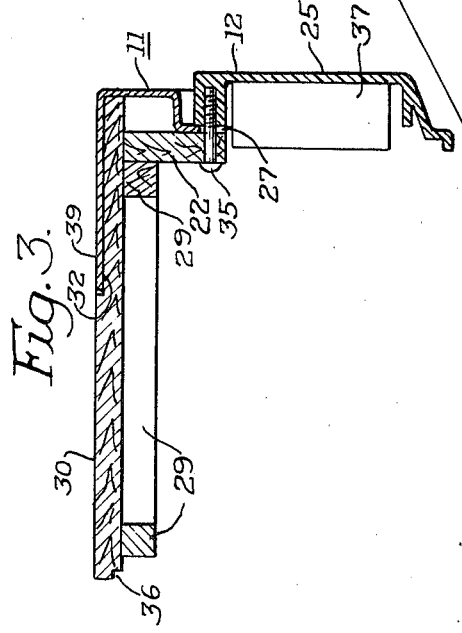
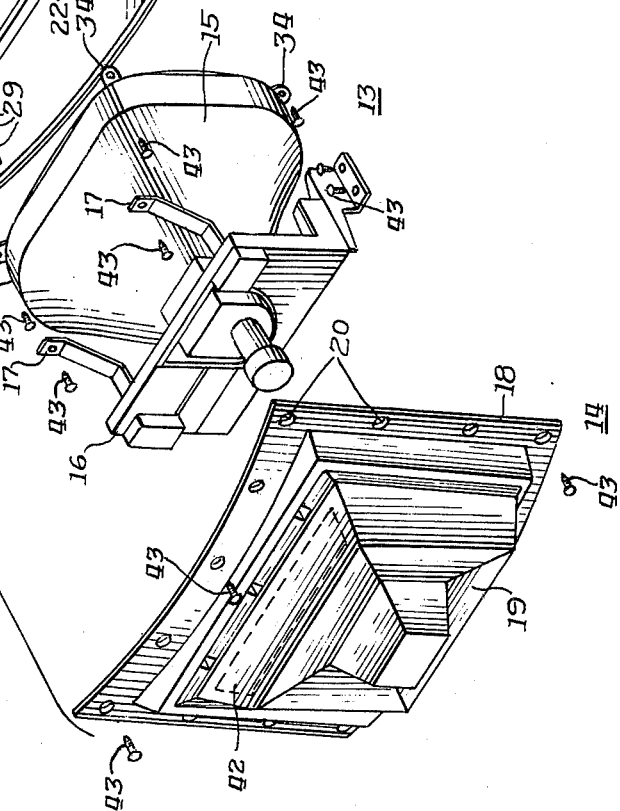

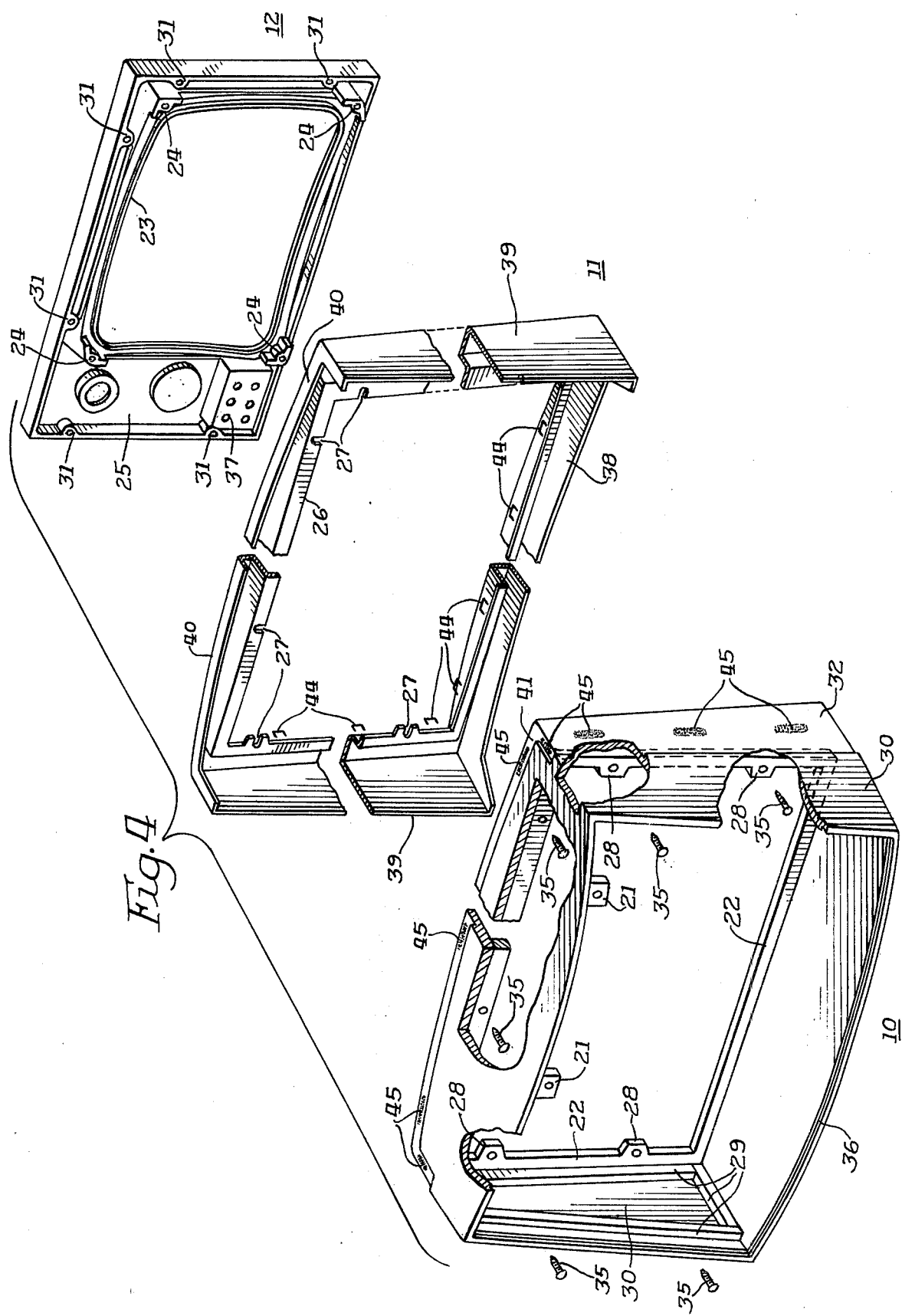

TELEVISION RECEIVER CABINET WITH FORMED DECORATIVE FRONT

BACKGROUND OF THE INVENTION

This invention relates generally to cabinets for television recievers and particularly to console type television receivers of modern styling.

From the inception of television broadcasting, the television receiver has occupied an important place in the viewer's home. In particular, because of many viewers' preferences for watching television programs in the comfort of their living areas, the demand for furniture-styled television receivers has always been great. Consequently, receivers have always been available in a variety of furniture styles to suit nearly every decor.

The subject of this invention is specifically concerned with those console television receivers of modern styling which are characterized by curved contours and smooth free-flowing lines.

During the last few decades the growth of the plastics industry has parallelled the development of the consumer electronics industry. It is now unusual to find radio, high fidelity and portable television cabinets manufactured from anything other than plastic material, whether finished in bold colors or simulated wood graining. Indeed, it may safely be said that the plastics medium has provided inspiration for designers who have responded with a whole new generation of consumer product styles.

Plastic is also extensively used in television receiver console cabinets and other furniture type consumer products, as distinct from radios and portable phonos. Entire cabinet fronts and sides are fabricated in molded plastic having a textured and grained surfaces which closely simulate natural wood. Molded high impact plastic material may also be made exceptionally strong by proper use of strengthening ribs, bosses and other support areas in the mold cavity. Even picture tube escutcheons, which generally support the weight of the picture tube and accessory components, are made of molded plastic. Plastic escutcheons have been used for many years in monochrome receivers and small color receivers where the picture tube is not very heavy, and of late are becoming common as the material for escutcheons of large screen color receivers.

Economics is an especially important factor in the broad-based consumer products industry and particularly in the television business. In many areas wood cabinetry and die cast metal escutcheons have given way to molded plastic parts, accompanied by a substantial decrease in weight without sacrifice of durability or ruggedness. Major drawbacks in using molded plastic parts is the cost of "tooling" required to manufacture the parts and the time required to make the tools.

There are, of course, other ways to shape and form plastic materials. Of primary concern is the technique known as vacuum-forming, which involves drawing a softened sheet of plastic material against the walls of a mold by evacuation of air. The mold may be either a die member, over which the material is "sagged" or a cavity, into which the material is sagged. In certain instances, rams or helper tools may be used to assist in the forming process, especially where sharp corners are desired. There are limitations on the thickness of material used, and the mold contours, etc. Of particular significance is the fact that strengthening members may not be added and that the vacuum-formed parts are not self-supporting. A typical use of vacuum-formed plastic may be seen in refrigerator and freezer door and cabinet liners.

A closely allied technique to vacuum-forming is thermal-forming. Here vacuum is not used, but rather the plastic sheet is heated and formed by lightweight low cost tools. In general thermal-forming enables better control of material thickness through zone heating and is capable of producing sharper corners. In this specification it will be understood that the term "formed" includes both vacuum and thermal forming and any combination thereof.

It is simple to obtain smooth exterior surfaces and free-flowing contours with these forming techniques. The invention uses a cabinet design which is very attractive in that the advantages of formed plastic parts, as distinct from injection or compression molding, accrue. The major advantage is economic and stems from the significantly lower tooling costs for vacuum or thermal forming. Another factor is time. Forming tools generally take a lot less time to build than compression or injection molding tools. This, of course, translates into shorter "drawing-board-to-consumer time." While tooling cost may be minimal in a large run of similar type products, for relatively low volume products, it is a major factor in the cost to the consumer.

It is a well-known fact that console television cabinets are relatively expensive mainly because they require substantial quantities of wood or wood products such as chip board. It is also well-known that their sales volumes (on a model basis) are not nearly those enjoyed by less expensive, more versatile, portable television receivers. A console receiver of ultra-modern style may be produced in such low volume that the tooling costs become significant in pricing the product. Further, minor changes in styling from year to year, or adopting the same styling motif to receivers of different screen sizes may be encouraged by the low tooling cost and fairly short tooling time involved.

OBJECTS OF THE INVENTION

A primary object of this invention is to provide a console television receiver of novel construction.

Another object of this invention is to provide a cabinet construction for a color television receiver which affords substantial economic benefit.

SUMMARY OF THE INVENTION

In accordance with the invention a television cabinet includes a top, bottom, sides and front frame to which is attached a picture tube supporting escutcheon. A formed decorative member defines an opening and is supported, in the area of the opening, to the front frame. The free ends of the formed member are fastened to the cabinet.

BRIEF DESCRIPTION OF THE DRAWINGS

Other objects and advantages of this invention will become apparent upon reading the following specification in conjunction with the drawings in which:

FIG. 1 is an exploded perspective view of a television receiver constructed in accordance with the invention;

FIG. 2 is a cross section of the cabinet shell, decorative front and escutcheon of FIG. 1;

FIG. 3 is a partial sectional view taken along the lines 3—3 of FIG. 2; and

FIG. 4 is an enlarged perspective of a portion of FIG. 1.

DESCRIPTION OF THE PREFERRED EMBODIMENT

In FIG. 1 a cabinet shell 10 includes a top, a bottom and a pair of side walls 30. A front frame 22 is provided in the frontal opening of cabinet shell 10 and a plurality of side braces 29 are mounted in supportive relationship with each side wall 30 and the top and bottom. Front frame 22 includes a number of support points 28, only one of which is shown in FIG. 1, for mounting a conventional picture tube escutcheon 12. It will be appreciated that cabinet shell 10 may be constructed in a variety of ways from a variety of materials.

For purposes of this invention cabinet shell 10 must be of sufficiently rigid construction to support the bulk of the television receiver weight. Also front frame 22 is preferably made of a solid structural material such as wood. The exterior surfaces of cabinet shell 10 may be painted, stained or otherwise finished. The bottom of cabinet shell 10 should have suitable ventilation apertures formed therein. The front edges of the top and bottom and a substantial portion of the side walls of the cabinet shell are rabbetted to provide circumferential support surfaces disposed about the frontal portion of the cabinet. This is clearly shown by top support surface 41 and wide support surface 32. It will be understood that the other side and bottom have similar support surfaces. As will be made clear, the support surfaces are not finished and, indeed, may advantageously have a roughened surface for better glue adhesion. The back edge of the shell includes a circumferential lip 36 for flush mounting of a back.

A decorative front 11, formed of plastic material, has a cutout 26 slightly larger than the opening defined by front frame 22 but smaller than the outer dimensions of an escutcheon 12. A plurality of mounting holes 27 is provided in cutout 26 for cooperation with support points 28 in the cabinet shell. The decorative front has a bottom portion 38, side portions 39 and a top portion 40 for cooperative engagement with the corresponding support surfaces of cabinet shell 10.

Escutcheon 12 includes a generally rectangular picture tube opening or window 23, four picture tube mounts 24, located at the diagonals of the window, and a panel section 25. Escutcheon 12 may be fabricated of die cast metal, or molded plastic with suitable strengthening ribs, and is attachable to cabinet shell 10 by suitable fasteners such as bolts 35 mounted through the holes in support points 28 and seating in escutcheon mounts 31. Mounts 31 in a metal escutcheon comprise semi-circular bosses of material with threaded apertures designed to receive conventional screws. In a molded plastic escutcheon the apertures in the plastic bosses would not be threaded and the screw fasteners would be of the self-tapping type. As indicated in FIGS. 2 and 3, decorative front 11 is "sandwiched" between cabinet shell 10 and escutcheon 12 when assembled.

A chassis assembly 13 comprises a picture tube 15 and a chassis 16 having a pair of mounting brackets 17. Picture tube 15 has suitable mounting means attached thereto such as a conventional tension strap 33, with mounting ears 34 attached, circumferentially surrounding the faceplate of the tube. Mounting ears 34 are secured to picture tube mounts 24 by suitable fasteners 43 for supporting the picture tube from the escutcheon. Mounting brackets 17 on chassis 16 are aligned with a pair of wood block chassis mounts 21 on the underside of the top of cabinet shell 10 and attached thereto by screw fasteners 43.

A back 14, including a molded portion 19 and a formed portion 18, is designed to fit into lip 36 in the rear of cabinet shell 10 and is fastened by suitable screw fasteners 43 through fastening holes 20. A vent area 42, indicated by the dashed line box, is provided in the top and bottom of molded portion 19 to permit air circulation. While not germane to the present invention, the two piece construction of back 14 represents a cost effective solution to the problem of proliferating television receiver sizes, particularly where the back plays an important role in receiver esthetics. Here, molded portion 19 (which, it will be recalled, requires expensive tooling) is a standard item used on a number of different sized receivers and formed portion 18 is added for the particular receiver. This construction is the subject of a copending application Ser. No. 632,350, filed Nov. 14, 1975, and assigned to Zenith Radio Corporation.

FIG. 2 shows cabinet shell 10, decorative front 11 and escutcheon 12 when assembled. For purposes of clarity, the picture tube and chassis are omitted. Bolts 35 support decorative front 11 between support points 28 on front frame 22 and escutcheon mounts 31. Top portion 40 is nested with rabbetted top support surface 41 as is bottom portions 38. The entire front of the cabinet shell (as well as portions of its top, bottom and sides) is covered by decorative front 11. This is not only important from a styling point of view, but also precludes the need for "edge finishing" of the cabinet shell.

In FIG. 3 the details of nesting of rabbetted side support surface 32 formed in side wall 30 and side support 39 of decorative front 11 are shown. Panel section 25 of escutcheon 12 includes a control box 37 for providing viewer access to the usual receiver operating controls. Note particularly that the decorative front is sandwiched between escutcheon 12 and front frame 22 around cutout 26 by bolts 35 whereas its free end portions are supported in abutting relationship with the corresponding rabbetted support surfaces of cabinet shell 10. The rabbet joints minimize the exposed edges of the cabinet sides (as well as the exposed edges of the top and bottom) and not only forms a smooth flowing contour but represents a construction economy. Since front 11 is vacuum or thermal formed, it is not self-supporting and is preferably stapled to structural members where visual considerations permit, and glued in other places.

In FIG. 4 further assembly details are shown. In particular, the alignment between bolts 35, support points 28, mounting holes 27 in decorative front 11 and escutcheon mounts 31 is shown. Lip 36, extending around the rear periphery of cabinet shell 10 is also shown in detail. A plurality of staples 44 are shown disposed about the periphery of cutout 26 in decorative front 11. The staples are driven through the plastic of front 11 into support frame 22 in positions such that they will not be visible when escutcheon 12 is in position. Similarly, a series of glue areas 45 are shown on top support surface 41 and side support surface 32 of cabinet shell 10. The glue may be thermosetting for tight bonding of the plastic in decorative front 11 to the wood structure of the cabinet shell.

Decorative front 11 was made by vacuum-forming a thin sheet of pre-softened plastic material over a suitable mold or die. The invention is not concerned with the vacuum-forming process itself, which is well-known in the art. Suffice it to say that the die is configured to the inside of decorative front 11 and includes a myriad of microscopic holes through which air may be drawn. As the heated plastic "drapes" over the mold, a vacuum is developed which pulls the plastic up against the mold surfaces. The decorative front may also be fabricated by thermal-forming the plastic sheet.

After removal of the front from the mold, cutout 26 and mounting holes 27 and the contours of the bottom, top and sides are fabricated by machining, preferably routing. The front is painted or otherwise finished as desired (including leaving the plastic in its original opaque color) and placed in position adjacent the cabinet shell which has its side, top and bottom support portions liberally coated with a suitable cement or glue. Staples are driven through the plastic material adjacent cutout 26 into front frame 22 and upon setting of the glue, the decorative front is maintained in firm contact with the cabinet shell. Thereafter the escutcheon is mounted to the front frame with bolts. The picture tube may be installed on the escutcheon before or after the escutcheon is mounted into position. Assembly of the receiver, chassis and back proceeds in a normal manner.

It should be noted that the decorative front is not exposed to the inside of the cabinet shell and therefore has no direct exposure to the chassis and picture tube of the assembled receiver. Consequently, it may safely be made of ordinary ABS type plastic rather than the more expensive flame retardant plastics required where such exposure exists. ABS stands for Acrylonitrile Butadiene Styrene and is similar to polystyrene plastic. Thus the decorative front does not represent an expensive component of the receiver.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

What is claimed is:

1. A television receiver comprising: a chassis; a picture tube; a cabinet for housing said chassis and picture tube, said cabinet having a top, a bottom, a back, sides and a front frame defining a first substantially rectangular picture tube escutcheon opening; a removable rigid picture tube escutcheon, said cabinet having an unfinished front edge adjacent said rectangular opening, a formed decorative member having a configuration similar to said unfinished front edge of said cabinet and defining a second substantially rectangular picture tube escutcheon opening; means mounting said escutcheon to said front frame of said cabinet in said first opening; means for supporting said picture tube, within said cabinet, from said escutcheon; means supporting said decorative member on said front frame around said second opening; and means fastening the free ends of said formed member to said cabinet to thereby conceal said unfinished front edge.

2. A television receiver as set forth in claim 1, wherein each of said sides includes a support surface; said decorative member having side portions each formed to closely overlie said support surface.

3. A television receiver as set forth in claim 2, wherein said top, bottom, sides and front frame are arranged to completely isolate said decorative member from exposure to the inside of said cabinet.

4. A television receiver as set forth in claim 3, wherein said fastening means comprises glue between said support surfaces and said side portions.

5. A television receiver as set forth in claim 4, wherein the area of said second opening in said decorative member is similar to, but less than, the area of said escutcheon, said decorative member being supported around the area of said second opening by being sandwiched between said escutcheon and said front frame.

6. A television receiver as set forth in claim 5, wherein said support surfaces are shaped to form a rabbet joint with said side portions to minimize the exposed edges of said sides.

7. A television receiver as set forth in claim 6, wherein said top and bottom each have a rabbetted support surface and wherein said decorative member is formed to overlie said top and bottom support surfaces in rabbet joints.

* * * * *